United States Patent
Naccache et al.

(10) Patent No.: US 10,187,119 B2
(45) Date of Patent: Jan. 22, 2019

(54) METHOD FOR WIRELESS TRANSMISSION OF DATA TO A MAGNETIC READ HEAD, CORRESPONDING COMMUNICATIONS TERMINAL AND CORRESPONDING PROGRAM

(71) Applicant: Ingenico Group, Paris (FR)

(72) Inventors: David Naccache, Paris (FR); German Ardila, Miami, FL (US)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/542,584

(22) PCT Filed: Jan. 8, 2016

(86) PCT No.: PCT/EP2016/050319
§ 371 (c)(1),
(2) Date: Jul. 10, 2017

(87) PCT Pub. No.: WO2016/110591
PCT Pub. Date: Jul. 14, 2016

(65) Prior Publication Data
US 2017/0373724 A1    Dec. 28, 2017

(30) Foreign Application Priority Data
Jan. 9, 2015 (FR) .................................. 15 50190

(51) Int. Cl.
*H04B 5/00* (2006.01)
*G06Q 20/32* (2012.01)
*G06K 7/10* (2006.01)

(52) U.S. Cl.
CPC ....... *H04B 5/0037* (2013.01); *G06K 7/10009* (2013.01); *G06Q 20/327* (2013.01); *H04B 5/0031* (2013.01)

(58) Field of Classification Search
USPC ............................ 455/572, 575.1, 3.01–3.06
See application file for complete search history.

(56) References Cited

U.S. PATENT DOCUMENTS

| | | | |
|---|---|---|---|
| 8,814,046 B1 | 8/2014 | Wallner | |
| 9,734,669 B1* | 8/2017 | Mullen | ............... G07F 17/329 |
| 2012/0037709 A1* | 2/2012 | Cloutier | .......... G06K 19/06206 |
| | | | 235/488 |
| 2014/0117094 A1* | 5/2014 | Workley | ............... G06K 7/084 |
| | | | 235/492 |
| 2014/0256251 A1* | 9/2014 | Caceres | ............. H04B 5/0031 |
| | | | 455/41.1 |
| 2014/0269946 A1 | 9/2014 | Wallner | |

(Continued)

OTHER PUBLICATIONS

International Search Report dated Apr. 12, 2016 for corresponding International Application No. PCT/EP2016/050319, filed Jan. 8, 2016.

(Continued)

*Primary Examiner* — Fayyaz Alam
(74) *Attorney, Agent, or Firm* — David D. Brush; Westman, Champlin & Koehler, P.A.

(57) ABSTRACT

A mobile communications terminal, namely a terminal of the type having a screen, at least one radio communications component and at least one wireless charging terminal. The terminal furthermore includes a component for transmitting an F2F signal by using the at least one wireless charging coil.

8 Claims, 2 Drawing Sheets

(56) References Cited

U.S. PATENT DOCUMENTS

2014/0349572 A1* 11/2014 Ben-Shalom ........ H04B 5/0031
455/41.1
2017/0213218 A1* 7/2017 Pickering ............. G06K 19/145

OTHER PUBLICATIONS

Written Opinion of the International Searching Authority dated Jul. 14, 2016 for corresponding International Application No. PCT/EP2016/050319, filed Jan. 8, 2016.

English translation of the Written Opinion of the International Searching Authority dated Apr. 20, 2016 for corresponding International Application No. PCT/EP2016/050319, filed Jan. 8, 2016.

* cited by examiner

METHOD FOR WIRELESS TRANSMISSION OF DATA TO A MAGNETIC READ HEAD, CORRESPONDING COMMUNICATIONS TERMINAL AND CORRESPONDING PROGRAM

CROSS-REFERENCE TO RELATED APPLICATIONS

This Application is a Section 371 National Stage Application of International Application No. PCT/EP2016/050319, filed Jan. 8, 2016, which is incorporated by reference in its entirety and published as WO 2016/110591 on Jul. 14, 2016, not in English.

1. FIELD OF THE INVENTION

The present invention relates to a method for the wireless transmission of data according to a pre-defined form factor.

2. PRIOR ART

Payment cards with magnetic tracks carry a magnetic stripe containing payment card data. Magnetic stripe payment cards are generally credit cards, debit cards, gift cards and promotional cards.

The pieces of data are recorded on the magnetic stripe in alternating the orientation of the magnetic particles integrated into the stripe. The card data are read from the magnetic stripe, generally situated on the back of the card, by a payment terminal. This is done by swiping the card in a magnetic stripe reader.

The reader comprises a read head and its associated decoding circuit. When the card is swiped or slid in the reader of the magnetic stripe, it moves before the read head. The mobile magnetic stripe, which contains magnetic domains of alternating polarity, creates a fluctuating magnetic field in the narrow detection aperture of the read head. The read head converts this fluctuating magnetic field into an equivalent electrical signal. The decoding circuit amplifies and digitizes this electrical signal in order to re-create the same data stream that was originally written on the magnetic stripe. The encoding of the magnetic track is described in the international standards ISO7811 and 7813.

The growing popularity and capacity of smartphones has encouraged industrial firms to propose payment solutions using these terminals. The main obstacle to the adoption of payment by these terminals has been the lack of data transfer channels between the mobile telephones and the sales point terminal. A certain number of solutions have been proposed. In one recent solution, the communications terminal is provided with a data transmission device. This data transmission device is connected for example to the audio jack connector of the terminal. This solution is described in the document US20140269946. This solution is not very practical because it requires the addition of a device to the user's mobile terminal. Such an addition is unsightly. This unsightly arrangement is a major obstacle to the adoption of such a system. It furthermore requires the purchase of an additional device, and this is uneconomical.

3. SUMMARY

The proposed technique does not have the drawbacks of the prior art. More particularly, the proposed technique relates to a technique of data transmission to a magnetic head of a magnetic stripe reader in which a magnetic card form factor is reproduced with a given timeout for the reproduction of the form factor.

More particularly, the technique relates to a mobile communications terminal, namely a terminal of the type comprising a screen, at least one radio communications component and at least one wireless charging coil. Such a terminal furthermore comprises a component for transmitting an F2F signal by means of said at least one wireless charging coil.

More particularly, the technique relates to a mobile communications terminal, namely a terminal of the type comprising a screen, at least one radio communications component and at least one integrated transmitting antenna, this terminal being characterized in that it furthermore comprises a component for transmitting an F2F signal by means of said integrated transmitting antenna.

According to one particular characteristic, said integrated transmitting antenna is a wireless charging coil of the communications terminal.

According to one particular characteristic, said wireless charging coil is positioned on the rear face of the communications terminal.

According to one particular characteristic, said wireless charging coil is integrated into a rear face of said communications terminal.

According to one particular embodiment, said component for transmitting an F2F signal comprises:
  means for obtaining at least one piece of data to be transmitted;
  means for the encoding, in the F2F format, of said piece of data to be transmitted, delivering a piece of encoded data;
  means for modulating a current and/or an electrical voltage and/or a frequency induced in said integrated transmitting antenna, said means being implemented by means of said piece of encoded data.

According to one particular characteristic, said data to be transmitted is a piece of data representing a means of payment.

According to one particular characteristic, said piece of data to be transmitted is a piece of data representing an identifier generated by an application installed within said communications terminal.

According to another aspect, the present technique also relates to a method for the wireless transmission of data to a magnetic read head, this method being implemented by a communications terminal as described here above, the method comprising:
  a step (100) for obtaining at least one piece of data to be transmitted;
  a step (110) for encoding the piece of data in the required format (for example F2F) delivering a piece of encoded data;
  a step (120) for modulating a current and/or an electrical voltage and/or a frequency of a sending antenna of the communications terminal so as to produce an electromagnetic field as a function of the encoded data.

According to the proposed technique, the transmitting antenna used is an inductive charging coil of the communications terminal.

According to a preferred implementation, the different steps of the methods according to the proposed technique are implemented by one or more software programs or computer programs comprising software instructions to be executed by a data processor of a relay component according to the proposed technique, the processor being designed to command the execution of the different steps of the methods.

The proposed technique is therefore also aimed at providing a program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or communications terminal whatsoever capable of storing the program. For example, the carrier can comprise a storage means such as a ROM, for example, a CD ROM or microelectronic circuit ROM or again a magnetic recording means, for example a floppy disk or a hard disk drive.

Furthermore, the information carrier can be transmissible carrier such as an electrical or optical signal which can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "component" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the component concerned. Such a software component is executed by a data processor of a physical entity (terminal, server, gateway, router etc) and is capable of accessing hardware resources of this physical entity (memories, recording media, communications buses input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with each other to implement the proposed technique.

4. DRAWINGS

Other features and advantages of the invention shall appear more clearly from the following description of a preferred embodiment, given by way of a simple illustrative and non-exhaustive example and from the appended drawings, of which:

Figure 3:
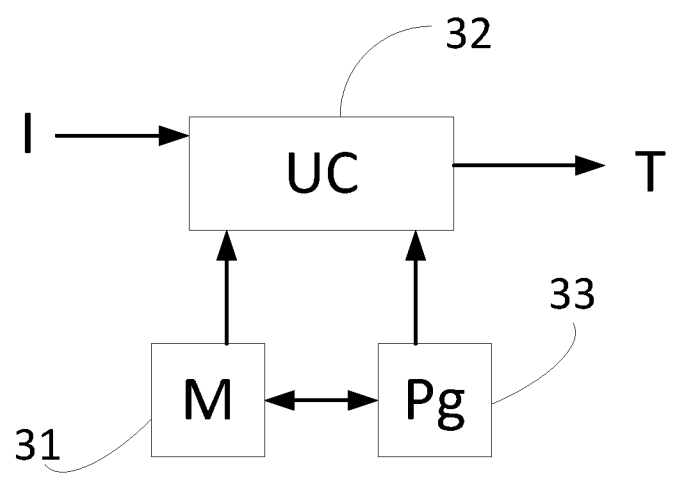

FIG. 3 describes a communications terminal according to the present invention.

5. DESCRIPTION 5.1. Principle of the Invention

The general principal of the present technique consists in carrying out data transmission in the F2F format using an existing transmission means available in the communications terminal. This transmission means must possess transmission characteristics sufficient to enable the formation of a magnetic field that could be picked up by a magnetic head of a payment terminal. More specifically, the means used to carry out this transmission is an antenna of the communications terminal. The antenna used in practice depends on the distance up to which it is desired that the communications terminal should be capable of transmitting data to the payment terminal. Thus, for example, the use of a GPRS (General Packet Radio Service) or WiFi type transmission antenna enables the performance of highly localized transmission (of the order of 2 or 3 millimeters at most). Depending on situations, such a distance may be greatly insufficient or even inefficient. Indeed, in addition to the distance of transmission of the magnetic field, the power of this magnetic field is also important. Thus, it is desirable to have available a transmission means that can meet this requirement of transmission power. Thus, in one particular embodiment described here below, the antenna used is the inductive charging coil present in the communications terminal. Indeed, it is increasingly frequent to have inductive charging coils in modern communications terminals. These coils enable the communications terminal to be charged without any need to connect it to a power supply.

According to the proposed technique, the sending of wireless data is carried out by exciting one of the following devices, already integrated into the terminal, in a particular manner:

Bluetooth antenna and/or component;
an NFC antenna and/or component;
a Wi-Fi antenna and/or component;
a GPRS antenna and/or component;
an inductive charging antenna and/or component;
a screen.

The technique thus consists of a method of data transmission between a telephony terminal and a payment terminal implementing a technique of data transmission for the transmission of data coming from a magnetic card and characterized in that, for this transmission, the telephony uses a screen/GPRS component/Bluetooth component/inductive charging coil.

More particularly, unlike the prior-art technique, the present technique does not seek to perfectly reproduce an F2F encoding of a magnetic card. Indeed, the inventors have noticed that perfect reproduction of such wireless encoding is unnecessary. According to the proposed technique, besides, another advantage appears; the current trend is towards the miniaturizing of terminals while at the same time increasing their functions. Now, it is not possible to envisage adding a device, such as the one described in the prior art, into the communications terminal itself. Alternative solutions are therefore necessary to obtain a service equivalent to the one given by the prior-art device while at the same time making sure that the internal configuration of the communications terminal is not thereby impaired.

Depending on the embodiments of the proposed technique, the integration of the function of transmitting data (from the wireless magnetic card to a reader equipped with a magnetic head) can be implemented either by a software method (using an appropriate computer program) or by a hardware method (using particular hardware component).

According to the technique proposed, the transmission of data through the magnetic head has a timeout. Indeed, since the use of existing communications interfaces does not ensure a faultless reproduction of the encoding of the magnetic card, the inventors have had the idea of enabling repeated transmission of the data.

At least one embodiment of the proposed technique requires implementation by means of a smartphone type communications terminal comprising a transaction securing component called a "secure element." Such a transaction securing component is configured for use within the framework of the present invention in order to set up a secure connection between the communications terminal and a server.

In one specific embodiment of the proposed technique, the communications terminal that sends the data by using an existing interface (i.e. for example smartphone) also comprises a secured or trusted execution environment (TEE). The advantage of this approach is that it implements both a secure element (SE) for its securing characteristics and at the same time, a trusted execution environment (TEE) for the richer execution environment that it offers. In other words, the trusted execution environment (TEE) is in charge of transmitting data by using one of the interfaces of the communications terminal while the secure element offers more basic encryption and processing functions but also more secured functions. The advantage of this approach is that the secure element (SE) can be subjected to certification (for example bank certification) in a much simpler way than a trusted execution environment (TEE). This means that one additional advantage of the proposed solution, when it is used to carry out payment, lies in the fact that this solution can be certified in a much more simple way.

Besides, when a user obtains possession of a communications terminal integrating such a transaction securing component or element, he has the possibility, in what is called a provisioning phase, of activating certain of these types of services for which he wishes to be transmit data on the basis of initial magnetic data. For example, if the user wishes to be able to use his telephone to make payment transactions, he will activate the type of payment service corresponding to the type of card in his possession (for example "VISA® payment" or "MasterCard® payment"). Here below in the document, it is sought to obtain the type of service corresponding to a VISA® payment (this choice however being purely illustrative and is not exhaustive).

Once the choice of a type of service to be activated has been made, the provisioning phase comprises a step for supplying data associated with the particular service for which an authorization is requested when a transaction is made. Thus, if the user wishes to be able to make VISA® payments from his communications terminal, then in this provisioning phase he must furnish the pieces of data, associated with his VISA® bank card, that are needed for a transaction: bank card number, expiry date, name of bearer, visual cryptogram etc. This step can be done through manual entry of the information present in the bank card.

These pieces of sensitive data associated with a service and provided by the user are stored in the communications terminal in the secure element.

In general, the present technique has at least two advantages. The first advantage relates to the re-utilization of means already available in the communications terminal. This averts the need to integrate new and often bulky components. It is indeed known that modern communications terminals, including smartphones, have little space available for existing components, especially because of the miniaturizing of the terminals. The proposed technique removes the need to use more space. Besides, unlike the techniques used for example by Looppay™, the present technique does not require any additional processor. The processors or processors of the communications terminal are the only ones used to implement the steps of encoding and data transmission in the F2F format. Thus, the solution proposed by the present technique is more economical and does not require the purchase of complementary materials.

The communications terminal according to the present invention is therefore implemented so as to transmit a piece of data called data to be transmitted. This piece of data to be transmitted is encoded by a processor of the communications terminal as required by using a secured processing processor for example a transaction securing component called a secure element. The advantage of such an implementation is that it makes it possible to ensure that the pieces of data to be transmitted are encoded in a secured manner, independently of the "customer" application of the communications terminal (i.e. independently of the application used to start the transaction). For example, in the case of an application for selecting a payment means installed in the user's communications terminal, the encoding of the data to be transmitted (or F2F format) is done independently of this application for selecting payment means, and this ensures security in the encoding.

Figure 1:
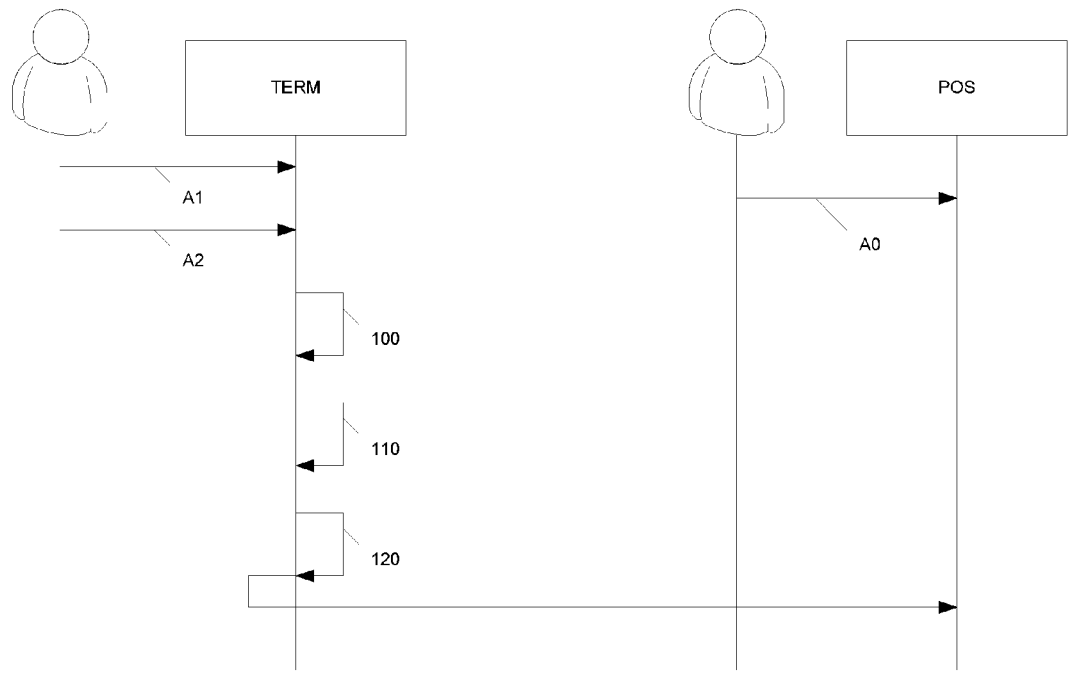
FIG. 1 is a block diagram showing data transmission.

In one particular mode of operation, the terminal that is the object of the present invention and the method of implementing it are used to make a payment by means of the communications terminal. The general process of the payment transaction implementing the present technique is described with reference to FIG. 1:

the merchant initializes the transaction either from a cash register or directly from the payment terminal (POS); this initialization generally starts with the entry of the amount of the transaction;

the merchant validates (A0) this initialization, the consequence of which is to place the payment terminal (POS) in a state of waiting for reception of the payment means; chiefly two means of payment are used at present: the smart card and the magnetic card;

concomitantly or preliminarily, the user selects (A1), on his communications terminal (TERM), the card data that he wishes to use, when the user has provisioned several payment cards (when the user has only one pre-recorded payment card available within the communications terminal, this selection is done automatically);

the user validates (A2) the use of this payment card in the payment data selection application of the communications terminal (TERM).

The present technique is then implemented by the communications terminal:

obtaining (100) the piece or pieces of data to be transmitted (for example credit card number, bearer's number, expiry day and verification code (CVV));

for each of these pieces of data, and in the order in which they are read by the payment terminal:

encoding (110) the piece of data in the required format (for example F2F) delivering a piece of encoded data;

modulating (120) an electrical current and/or a voltage and/or a frequency of a sending antenna of the communications terminal, so as to produce a magnetic field as a function of the encoded piece of data; this modulation prompts the transmission of the piece of encoded data to the payment terminal (POS).

Thus, through this technique, the payment card data is transmitted by wireless to the payment terminal by simulating a passage of a magnetic card before a magnetic head and doing so without any need to add on an additional device to the communications terminal. It can be noted that, instead of the encoding known as F2F encoding, it is possible to use other encoding systems such as the Manchester differential encoding scheme or again the Biphase Mark Code (BMC).

As an alternative, according to the present document, instead of the bank card data (name, card number, date, CVV), a token is transmitted. Such a token is generated by the communications terminal on the basis of identity and/or bank data. Such an implementation prevents the transmission of sensitive data by this channel. Besides, such an implementation does not require any entry of bank card data or payment data into an application installed on the communications terminal. Indeed, in this variant, it would be difficult for any attacker to interpret the transmitted data. More particularly, in transmitting a token rather than bank card data, the following steps are implemented:

on the communications terminal side, a token is generated; the token takes account of the user's bank card data and/or identification data;

the technique described here is implemented to transmit this token;

the payment terminal receives the token and notes that this is not the usual data (i.e. the data usually received by a magnetic card);

the payment terminal transmits the token to a processing (bank) server;

the bank server notes that this is a token and identifies the sender (for example it identifies the fact that this is a token generated by the application X);

the bank server transmits the token to the processing server X with which the application X is related;

in return, the bank server receives the necessary bank card data needed for payment; it makes the transaction and transmits a message of validation of transaction to the payment terminal.

Besides, the present technique can also be ingeniously applied to making contactless payment. Indeed, payment cards and communications terminals (acting as payment cards) are increasingly being provided with chips known as contactless chips. What is used is mainly an antenna, which may be active, capable of transmitting data from the payment card upon being questioned by a payment terminal. The payment terminal therefore needs to be provided with near field communications means. In certain countries or regions, this mode of payment is in full expansion. In other countries or regions, because of an absence of comparable payment terminals, this mode of payment is seeing little development. The inventors have had the idea of using the present technique to make up for the absence of compatible payment terminals by adding contactless conversion component. Such a component forms an interface between the contactless payment application of the communications terminal (which has been preliminarily installed) and the processing component as described here above. This is, in a way, a contactless emulation component.

When the user wishes to make contactless payment with his communications terminal but the payment terminal is not compatible (because it does not possess an NFC chip), the contactless conversion component translates the contactless data into magnetic stripe data. This translated data is then the data to be transmitted by means of the transmission component (with F2F encoding and modulation of the signal). A contactless payment can thus be made without structural modification of the communications terminal and without requiring the use of a contactless compatible payment terminal. More particularly, in this example, the NFC antenna of the communications terminal is used to make the transmission of the F2F encoded data. Indeed, there is no deceptive effect when the communications terminal is placed on the payment terminal to make a contactless payment: this is what happens currently in similar situations: either the communications terminal or the payment terminal is literally placed on the payment terminal to make the purchase. This means that, in this particular case, placing the communications terminal on the payment terminal is not troublesome and the use of a small-sized antenna (that of the communications terminal) can be considered.

As an alternative, transparently for the user on the one hand and for the payment terminal on the other hand, any other antenna or coil can be used to create a magnetic field carrying data in the appropriate format to the payment terminal.

5.2. Description of One Embodiment

In this embodiment, the inductive charging coil of the communications terminal is used to modulate the magnetic field created and transmit data in the F2F format. The advantage of the use of this coil lies chiefly in the size of the coil as compared with the size of the (other) antennas available in the communications terminal. Indeed, inductive charging coils generally have a greater surface area than communications antennas. This is because the charging of a battery by induction requires a solenoid valve with a single-layer winding at the terminal (so as to avoid making the terminal thicker and so as to thus obtain the benefit of the physical effects of the wireless transmission of energy). To compensate for the small thickness, a great surface area is needed.

Figure 2:
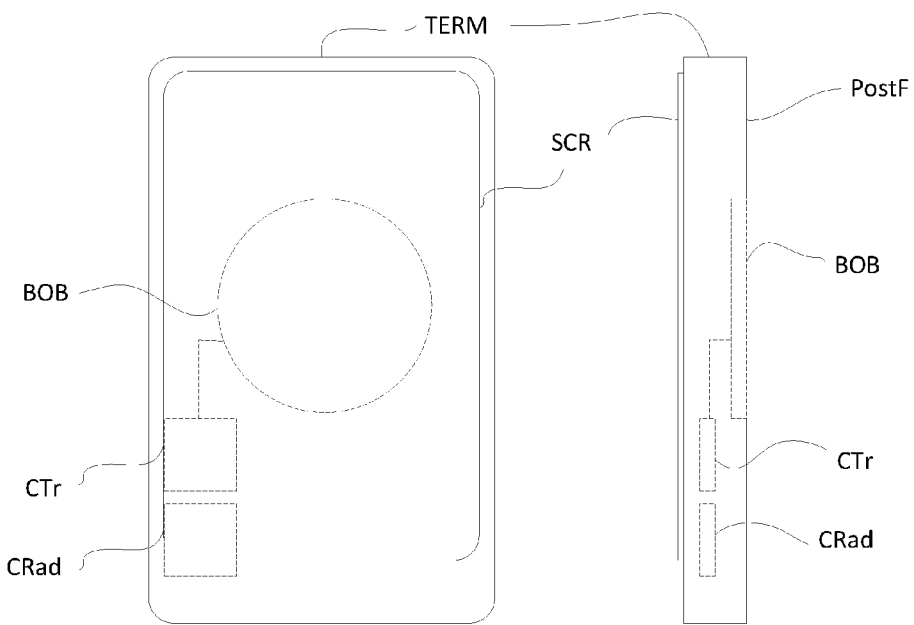
FIG. 2 is a simplified view of a communications device according to the present invention.

In this embodiment, the inventors thus propose to use this coil (which usually receives energy by induction) as a magnetic field emitter in order to transmit bank card data. Thus, this embodiment, briefly described with reference to FIG. 2, relates to a mobile communications terminal (TERM) of the type comprising a screen (SCR), at least one radio communications component (CRad) and at least one wireless charging coil (BOB). The terminal furthermore comprises a transmission component (CTr) for transmitting an F2F signal by means of said at least one wireless charging coil (BOB). In one specific embodiment, the wireless charging coil is positioned on the rear face (PostF) of the payment terminal.

5.3. Other Characteristics and Advantages

Referring to FIG. 3, a description is provided of a communications terminal implemented to transmit data by means of an inductive charging coil according to the method described here above.

For example, the communications terminal comprises a memory 31 constituted by a buffer memory, a processing unit 32 equipped for example with a microprocessor and driven by the computer program 33, implementing especially a method of transmitting data in the F2F format. At initialization, the code instructions of the computer program 33 are for example loaded into a memory and then executed by the processor of the processing unit 32. The processing unit 32 inputs at least one piece of data to be transmitted, such as a piece of bank card data or a piece of alternative payment data (such as a token). The microprocessor of the processing unit 32 implements the steps of the method according to the instructions of the computer program 33 to create a modulation of a magnetic field emitted by the inductive charging coil. As explained, the modulation of the magnetic field is preceded by an encoding of the data to be transmitted in the F2F format, if need be by creating a structure of data adapted to this encoding.

To this end, the communications terminal comprises, in addition to the buffer memory 31, communication means such as network communications components, a data transmission component and possibly a dedicated encryption processor.

All these means take the form of a particular processor implemented within the device, said processor being a secured processor capable of processing confidential data, such as data on payment means. According to one particular embodiment, this communications terminal implements a particular application that is in charge of the encryption and transmission of data, this application being for example furnished by the manufacturer of the processor in question in order to enable the use of said processor. To this end, the processor comprises unique identification means. These unique identification means ensure the authenticity of the processor.

The invention claimed is:

1. A mobile communications terminal comprising:
   a screen;
   at least one radio communications component;
   at least one integrated transmitting antenna associated to said at least one radio communications component, wherein said integrated transmitting antenna comprises a wireless charging coil of the communications terminal; and
   a transmitter component different than said at least one radio communications component, configured to transmit an F2F signal by using said integrated transmitting antenna.

2. The mobile communications terminal according to claim 1, wherein said wireless charging coil is positioned on a rear face of the communications terminal.

3. The mobile communications terminal according to claim 1, wherein said wireless charging coil is integrated into a rear face of said communications terminal.

4. The mobile communications terminal according to claim 1, wherein said transmitting component for transmitting an F2F signal comprises:
   means for obtaining at least one piece of data to be transmitted;
   means for encoding, in the F2F format, said piece of data to be transmitted, delivering a piece of encoded data;
   means for modulating a current and/or an electrical voltage and/or a frequency induced in said integrated transmitting antenna, said means being implemented by means of said piece of encoded data.

5. The mobile communications terminal according to claim 4, wherein said data to be transmitted comprises a piece of data representing a means of payment.

6. The mobile communications terminal according to claim 4, wherein said piece of data to be transmitted comprises a piece of data representing an identifier generated by an application installed within said communications terminal.

7. A method for wireless transmission of data to a magnetic read head, this method being implemented by a communications terminal having at least one radio communications component and at least one integrated transmitting antenna associated to said at least one radio communications component, wherein the method comprises:
   obtaining at least one piece of data to be transmitted;
   encoding the piece of data in a required format delivering a piece of encoded data; and
   modulating by a transmitter component different from said at least one radio communications component a current and/or an electrical voltage and/or a frequency of the at least one integrated transmitting antenna associated to the radio communications component so as to produce, through the at least one integrated transmitting antenna, an electromagnetic field as a function of the encoded piece of data to transmit an F2F signal by using the at least one integrated transmitting antenna, wherein the at least one integrated transmitting antenna comprises a wireless charging coil of the communications terminal.

8. A non-transitory computer-readable medium comprising a computer program product stored thereon, which comprises program code instructions for executing a method of wireless transmission of data to a magnetic read head, when the instructions are executed by a processor of a mobile communications terminal having at least one radio communications component and at least one integrated transmitting antenna associated to said at least one radio communications component, wherein the instructions configure the mobile communications terminal to perform acts comprising:
   obtaining at least one piece of data to be transmitted;
   encoding the piece of data in a required format delivering a piece of encoded data; and
   modulating by a transmitter component different from said at least one radio communications component a current and/or an electrical voltage and/or a frequency of the at least one integrated transmitting antenna associated to the radio communications component so as to produce, through the at least one integrated transmitting antenna, an electromagnetic field as a function of the encoded piece of data to transmit an F2F signal by using the at least one integrated transmitting antenna, wherein the at least one integrated transmitting antenna comprises a wireless charging coil of the communications terminal.

* * * * *